(12) United States Patent
Yue

(10) Patent No.: US 11,531,451 B2
(45) Date of Patent: Dec. 20, 2022

(54) REAL-TIME MORPHING INTERFACE FOR DISPLAY ON A COMPUTER SCREEN

(71) Applicant: Brain Technologies, Inc., San Mateo, CA (US)

(72) Inventor: Sheng Yue, San Mateo, CA (US)

(73) Assignee: Brain Technologies, Inc., San Mateo, CA (US)

( * ) Notice: Subject to any disclaimer, the term of this patent is extended or adjusted under 35 U.S.C. 154(b) by 75 days.

(21) Appl. No.: 17/013,324

(22) Filed: Sep. 4, 2020

(65) Prior Publication Data

US 2021/0064203 A1 Mar. 4, 2021

Related U.S. Application Data

(60) Provisional application No. 63/038,604, filed on Jun. 21, 2020, provisional application No. 62/895,944, filed on Sep. 4, 2019.

(51) Int. Cl.
| | |
|---|---|
| *G06F 3/0484* | (2022.01) |
| *G06F 3/16* | (2006.01) |
| *G06F 40/284* | (2020.01) |
| *G10L 15/22* | (2006.01) |
| *G10L 15/18* | (2013.01) |

(Continued)

(52) U.S. Cl.
CPC ............ *G06F 3/0484* (2013.01); *G06F 3/167* (2013.01); *G06F 40/284* (2020.01); *G06N 20/00* (2019.01); *G10L 15/1815* (2013.01); *G10L 15/22* (2013.01); *G06Q 30/0625* (2013.01); *G06Q 30/0633* (2013.01); *G06Q 30/0641* (2013.01); *G10L 2015/223* (2013.01)

(58) Field of Classification Search
None
See application file for complete search history.

(56) References Cited

U.S. PATENT DOCUMENTS

| | | |
|---|---|---|
| 9,633,317 B2 | 4/2017 | Gabel et al. |
| 10,838,779 B1 | 11/2020 | Yue et al. |

(Continued)

OTHER PUBLICATIONS

McGee, "Google Instant Search: The Complete User's Guide," Sep. 8, 2010, https://searchengineland.com/google-instant-complete-users-guide-50136.*

(Continued)

*Primary Examiner* — Ryan Barrett
(74) *Attorney, Agent, or Firm* — Fenwick & West LLP

(57) ABSTRACT

A morphing interface system updates, that is, morphs, a display on a client device as a user provides portions of input. The system receives a first portion of user input and selects an intent related to a predicted intent of the user that matches or can be associated with the portion of user input. The system displays an interface associated with the intent at the client device. The system additionally extracts entity values associated with execution of the intent from the first portion of the user input. As the user provides additional portions of input, the morphing interface system reevaluates the user input and determines whether the user input still indicates the same user intent, and thus the same intent for execution. Upon determining that the additional input indicates a different user intent, the system updates the display to show an interface associated with the new intent.

18 Claims, 17 Drawing Sheets

(51) Int. Cl.
*G06N 20/00* (2019.01)
*G06Q 30/06* (2012.01)

(56) References Cited

U.S. PATENT DOCUMENTS

| | | | |
|---|---|---|---|
| 2008/0104037 A1 | 5/2008 | Bierner | |
| 2011/0112827 A1* | 5/2011 | Kennewick | G10L 15/22 704/226 |
| 2012/0016678 A1* | 1/2012 | Gruber | B60K 35/00 704/275 |
| 2012/0233207 A1 | 9/2012 | Mohajer et al. | |
| 2013/0110519 A1* | 5/2013 | Cheyer | G10L 21/06 704/275 |
| 2013/0117253 A1 | 5/2013 | Wang et al. | |
| 2013/0117297 A1 | 5/2013 | Liu et al. | |
| 2013/0226953 A1 | 8/2013 | Markovich et al. | |
| 2013/0311997 A1* | 11/2013 | Gruber | H04W 4/00 718/102 |
| 2014/0272821 A1* | 9/2014 | Pitschel | G09B 19/06 434/157 |
| 2015/0066968 A1 | 3/2015 | Bastide et al. | |
| 2015/0347503 A1 | 12/2015 | Kumaran et al. | |
| 2016/0217124 A1 | 7/2016 | Sarikaya et al. | |
| 2016/0259775 A1 | 9/2016 | Gelfenbeyn et al. | |
| 2017/0132019 A1* | 5/2017 | Karashchuk | H04L 51/02 |
| 2017/0199943 A1 | 7/2017 | Steelberg et al. | |
| 2018/0052824 A1* | 2/2018 | Ferrydiansyah | G06N 20/00 |
| 2018/0068657 A1* | 3/2018 | Khan | G10L 15/063 |
| 2018/0122009 A1* | 5/2018 | Jaycobs | G06F 3/0488 |
| 2018/0137855 A1* | 5/2018 | Lee | G06F 40/232 |
| 2018/0150280 A1* | 5/2018 | Rhee | G06F 3/167 |
| 2018/0197540 A1* | 7/2018 | Lee | G10L 15/22 |
| 2018/0233141 A1* | 8/2018 | Solomon | G01S 5/18 |
| 2018/0268345 A1* | 9/2018 | Tolica | G06Q 10/107 |
| 2019/0237061 A1* | 8/2019 | Rusak | G10L 15/063 |
| 2019/0244419 A1* | 8/2019 | Bell | G06T 19/003 |
| 2019/0258456 A1* | 8/2019 | Byun | G06F 40/35 |
| 2019/0341040 A1* | 11/2019 | Kirazci | G06F 3/167 |
| 2020/0143798 A1* | 5/2020 | Kim | G10L 15/30 |
| 2020/0159824 A1* | 5/2020 | Boxwell | G06F 16/3344 |
| 2020/0160863 A1* | 5/2020 | Lee | G06F 40/35 |
| 2020/0326832 A1* | 10/2020 | Lee | G06F 3/04842 |
| 2020/0380077 A1* | 12/2020 | Ge | G10L 15/18 |
| 2020/0387550 A1* | 12/2020 | Cappetta | H04L 51/02 |
| 2021/0064203 A1 | 3/2021 | Yue | |

OTHER PUBLICATIONS

Berner, U. et al., "A Scalable Avatar for Conversational User Interfaces," ERCIM Workshop on 1-20 User Interfaces for All, Mar. 14, 2003, pp. 1-11.

PCT International Search Report and Written Opinion, PCT Application No. PCT/US2020/049544, dated Dec. 8, 2020, pp. 1-14.

Microsoft News, "Microsoft Patents Dynamic User Interface That Changes According to a Type of Input," Dec. 5, 2014, pp. 1-3, [Online] [Retrieved on Oct. 2, 2020] Retrieved from the Internet <URL: https://mspoweruser.com/microsoft-patents-dynamic-user-interface-that-changes-according-to-a-type-of-input/>.

Hirschberg, J. et al. "Advances in Natural Language Processing." Science, vol. 349, No. 6245, Jul. 17, 2015, pp. 261-266.

PCT International Search Report and Written Opinion, PCT Application No. PCT/US2022/017628, dated May 16, 2022, 18 pages.

Yuan, F. et al. "Future Data Helps Training: Modeling Future Contexts for Session-Based Recommendation." Proceedings of The Web Conference, Apr. 20-24, 2020, Taipei, Taiwan, pp. 1-11.

* cited by examiner

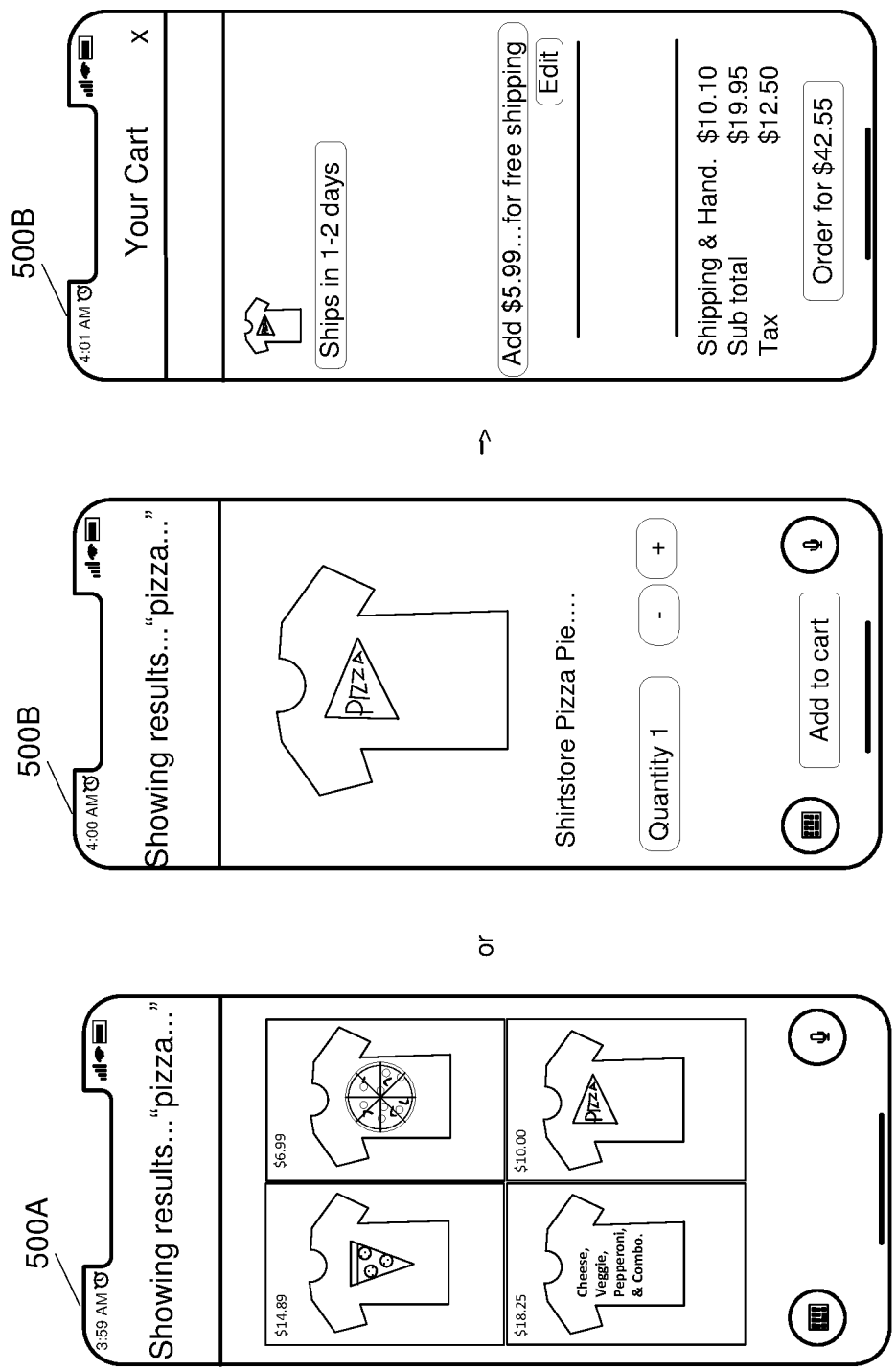

REAL-TIME MORPHING INTERFACE FOR DISPLAY ON A COMPUTER SCREEN

CROSS-REFERENCE TO RELATED APPLICATIONS

This application claims a benefit of U.S. Provisional Application No. 62/895,944, filed Sep. 4, 2019, and U.S. Provisional 63/038,604, filed Jun. 12, 2020, all of which are incorporated by reference herein in their entirety.

BACKGROUND

Computer assistants such as smart speakers and artificial intelligence programs are growing in popularity and in use in various user-facing systems. The computerized systems can often be implemented such that an entire process is automated without the human user of the system having any insight into the process. For example, a computer can complete a set of tasks without the need to display content to a screen for the user. However, many users prefer to receive feedback about a computerized process, and it may be useful or necessary for a user to understand the state of a set of tasks if the user is needed to provide feedback at a particular step.

Additionally, users want assistant systems to respond as quickly as possible. However, if a system responds to a user before it has received an entire set of instructions from the user, the system may perform an inapplicable task for the user, or may not have received enough information to display the content to the screen for the user to view. Thus, a system that includes, for example, displaying the progress of an automated task in real-time with the ability to adjust the display in response to additional input would be beneficial.

BRIEF DESCRIPTION OF THE DRAWINGS

FIG. 6D illustrates additional example interfaces that may be associated with the T-shirt purchasing intent, in accordance with an example embodiment.

Figure 1:
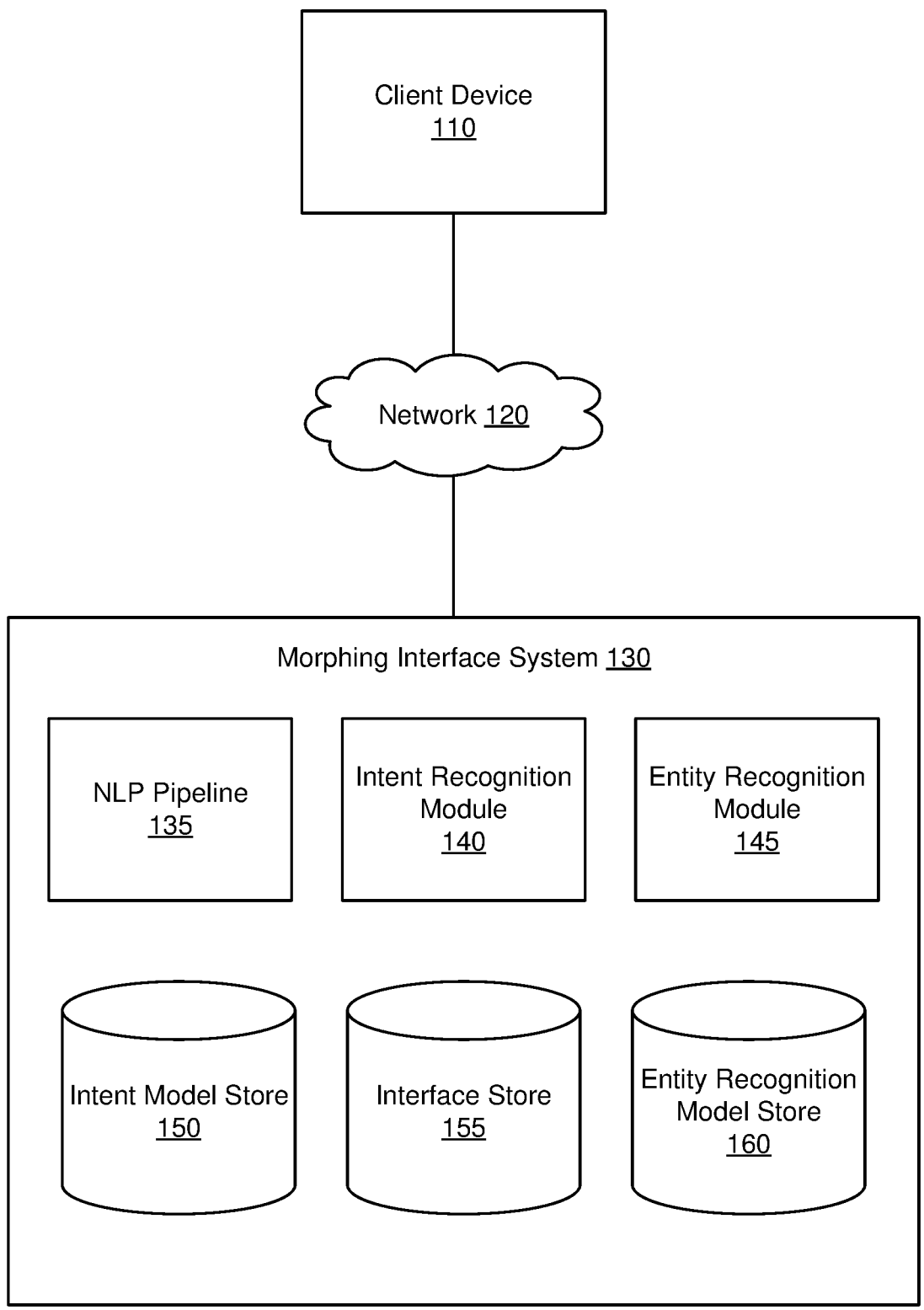
FIG. 1 is a high level block diagram of a system architecture for a morphing interface system, in accordance with an example embodiment.

A letter after a reference numeral, such as "105A," indicates that the text refers specifically to the element having that particular reference numeral, while a reference numeral in the text without a following letter, such as "105," refers to any or all of the elements in the figures bearing that reference numeral.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are systems (as well as methods and computer program code stored on non-transitory computer readable mediums) configured to generate and enable for display on a computer screen user interfaces. In one example embodiment, the system may include one or more computer processors for executing computer program instructions and a non-transitory computer-readable storage medium comprising stored instructions executable by at least one processor. In an example embodiment, the instructions may include instructions that when executed cause the processor to receive, from a first user device, a first input comprising an input string and to generate a set of natural language processing signals based on the first user input. The instructions may further include instructions to select a user intent that matches the first user input, the selection based on the natural language processing signals, to identify an interface associated with the intent, and to extract from the user input a set of values associated with entities of the interface. An entity may be a variable of an interface that can be assigned a value. In one example embodiment, the instructions may further include instructions to enable for display as the interface on the user device the interface for display including values from the set of values, the display to occur approximately instantaneously to the receipt of the first user input. In one example embodiment, the instructions executable by at least one processor of the system may further include instructions that when executed by the processor cause the processor to receive, from the user device, a second user input comprising a text string and generate an updated set of natural language processing signals based on the combination of the first user input and the second user input. The instructions may further include instructions to select an intent that matches the combination of the first user input and the second user input based on the updated set of natural language processing signals, instructions to identify a second interface associated with the newly selected intent, instructions to extract a second set of values associated with entities of the second interface from the combination of the first user input and the second user input, and instructions to enable the second interface for display on the user device including values from the second set of values.

In various example embodiments, the first user input and/or second user input may be voice inputs. Furthermore, the first interface and second interface may include associated sets of entities and may be the same or different interfaces in various example embodiments. The input string may be a text string, an audio input, and/or another form of user input.

Example System Configuration

Figure (FIG. 1 is a high level block diagram of a system architecture for a morphing interface system, in accordance with an example embodiment. FIG. 1 includes a morphing interface system 130, a network 120, and a client device 110. For clarity, only one client device and one morphing interface system 130 is shown in FIG. 1. Alternate embodiments of the system environment can have any number of client devices 110 as well as multiple morphing interface systems 130. The functions performed by the various entities of FIG. 1 may vary in different embodiments. The client device 110 and the morphing interface system 130 may include some or all of the components of a computing device such as one described with FIG. 7 and an appropriate operating system.

In an example embodiment, the morphing interface system 130 generates (or renders or enables for rendering) a user interface for display to a user in response to user input (e.g., a typed or spoken text string). In some embodiments, the system may also receive visual input, e.g., from a camera or camera roll of a client device 110, to effectuate a search process on an online marketplace. The morphing interface system 130 determines a user intent. The user intent corresponds to a machine (e.g., computer or computing system) prediction of what may be intended by a user based upon received user input. Accordingly, the user intent may be a computer executable function or request that corresponds to, and/or is described by, the received user input. The executable function may be instantiated by generating and/or populating (e.g., in a rendering) one or more user interfaces for the function that may be executed and that corresponds to what may be the predicted intent.

As the morphing interface system 130 receives additional user input (e.g., more words added to the typed or spoken text string), the morphing interface system 130 reevaluates whether the determined user intent is still the most relevant match to the user input. If another user intent better suits the updated user input, the morphing interface system 130 generates and populates a new user interface that applies to the new intent. That is, the user interface "morphs" from one interface to another interface as the morphing interface system 130 receives more input information about what user intent best applies to the input, i.e. which function or request best addresses the user input. In the event that the morphing interface system 130 determines multiple equally likely intents, the morphing interface system 130 may either prompt the user with interface previews (e.g., by providing information for rendering the interface previews at a client device 110) so that the user may pick between the equally likely intents, or the morphing interface system 130 may automatically choose an intent based on stored user preferences (e.g., as learned based on past user interactions with the system).

A user may enter user input such as typed text or spoken voice input via a client device 110. Client devices 110 can be any personal or mobile computing devices such as smartphones, tablets, notebook computers, laptops, desktop computers, and smartwatches as well as any home entertainment device such as televisions, video game consoles, television boxes, and receivers. The client device 110 can present information received from the morphing interface system 130 to a user, for example in the form of user interfaces. In some embodiments, the morphing interface system 130 may be stored and executed from the same machine as the client device 110.

The client device 110 can communicate with the morphing interface system 130 via the network 120. The network 120 may comprise any combination of local area and wide area networks employing wired or wireless communication links. In some embodiments, all or some of the communication of the network 120 may be encrypted.

The morphing interface system 130 includes various modules and data stores to determine intents and/or generate interfaces. The morphing interface system 130 comprises a natural language processing (NLP) pipeline 135, an intent recognition module 140, a entity recognition module 145, an intent model store 150, an interface store 155, and a entity recognition model store 160. Computer components such as web servers, network interfaces, security functions, load balancers, failover servers, management and network operations consoles, and the like are not shown so as to not obscure the details of the system architecture. Additionally, the morphing interface system 130 may contain more, fewer, or different components than those shown in FIG. 1 and the functionality of the components as described herein may be distributed differently from the description herein. It is noted that the pipeline and modules may be embodied as program code (e.g., software or firmware), hardware (e.g., application specific integrated circuit (ASIC), field programmable gate array (FPGA), controller, processor) or a combination thereof.

The NLP pipeline 135 receives user input, e.g., in the form of text or audio, and generates NLP signals that the morphing interface system 130 can use for intent recognition and for extracting entities. In some embodiments, the NLP pipeline 135 performs tokenization, part-of-speech tagging, stemming, lemmatization, stopword identification, dependency parsing, entity extraction, chunking, semantic role labeling, and coreference resolution. In one embodiment input to the NLP pipeline is a set of one or more words, for example, in the form of a complete or partially complete sentence or phrase. In one embodiment, the NLP pipeline 135 produces an annotated version of the input set of words. In another embodiment, the NLP pipeline 135 constructs or looks up numerical representations or feature embeddings for immediate consumption by downstream modules that may use neural networks such as the intent recognition module 140 or the entity recognition module 145. For example, the input to the NLP pipeline 135 may be a partial sentence and the output may be the partial sentence with accompanying metadata about the partial sentence.

The intent recognition module 140 identifies what may be intentions of the user based on inputs received from the user (via the client device 110). In particular, the intent recognition module 140 predicts an available intent (i.e., function) that the morphing interface system 130 can perform. The available intent corresponds to the set of words that make up a user input. The user input may be matched to one or more pre-defined intents. For ease of discussion, the system is described in the context of words. However, it is noted that the principles described herein also may apply to any set of signals, which may include sounds actions (e.g., voice commands or audio tones), video streams (e.g., in ambient computing scenarios), and other potential forms of informational input. In different embodiments, the intent recognition module 140 may use various machine learning models for determining an intent that can be associated with the user input. For ease of description, the system will be described in the context of supervised machine learning. However, it is noted that the principles described herein also may apply to semi-supervised and unsupervised systems.

In one example embodiment, the intent recognition module 140 may use text classification to predict an intent that is most likely to correspond to the user input. In this example embodiment, a text classification model may be trained using labeled examples of input strings. For example, the morphing interface system 130 may store labeled example input strings. The labels associate each example input string with one of the available intents. The training data may include example input strings in the form of words, partial sentences, partial phrases, complete sentences, and complete phrases. The classification model may also be trained to use the various natural language processing signals produced by the NLP pipeline 135 and the training data may additionally include natural language processing signals. The classification model may also make use of signals from the entity recognition module 145, for example using an "Airline" entity recognized by the entity recognition module 145 to ascertain that the intent or function is "Booking a flight". Thus, the classification model is trained to predict which of an available set of intents is most likely to correspond to a given user input string, for example using semantic similarity, i.e., determining the closest matching query from example sets of queries for each action)

In another example embodiment, the intent recognition module 140 may use a model that calculates a semantic similarity score between the user input and set of example inputs across the set of available intents. That is, rather than training a model to directly predict an applicable intent based only on labeled training data, the intent recognition module 140 can also compare a given user input to some or all previously received user input strings when determining the intent that best matches the user input. For example, the morphing interface system 130 may store a record of intents and input strings that were matched in the past, and if the intent recognition module 140 determines that a current user input string is the same, or has the same sentence structure or related NLP signals to a stored previous user input string, then the intent recognition module 140 may predict the same intent for the current user input string. In addition to a comparison with correctly-matched past user input strings, the user input may also be compared to computer generated strings created through both semantic rule-based approaches and generative deep learning algorithms.

In another example embodiment, the intent recognition module 140 may utilize simpler rule-based methods to infer the most likely intent for the user's input string. This may include regular expression matching, i.e., identification of certain predefined syntactic and grammatical patterns in the input string to determine the user's intent. This may also include utilizing signals from the NLP pipeline 130 such as the dependency parse, constituency parse, chunking, and/or semantic role labeling, to find the verb, subject, predicate and more of the query and match them to data from a stored knowledge base. For example, if the user's input is "Buy me bananas", the intent recognition module 140 may determine that the word "bananas" is the direct object of the query, and get a match for its lemma "banana" from a knowledge base to learn that "bananas" is a type of food or ingredient—this may indicate for example a match to a intent for buying groceries.

In some example embodiments, the morphing interface system 130 includes a intent model store 150. The intent model store 150 may store program code for computer models that are trained and applied by the intent recognition module 140 to predict an intent that is most likely to be relevant to a given user input string. In some embodiments, the labeled training data and records of previously matched intents and user inputs may be stored at the intent model store 150. The intent model store 150 can also store a list of available intents, that is, tasks that the morphing interface system 130 can perform for the user in response to a user input. The intent model store 150 can also store a list of unavailable intents, that is, tasks that the morphing interface system 130 cannot currently perform but has recognized as tasks that are independent from the available intents. Further the intent model store 150 can store custom intents built by users that are only available for those users. For example, a user input string "Turn on device" may not be in a list of globally available intents, but a user may have created this intent for their own use, and the intent logic would be stored in the intent model store 150.

In one embodiment the interface store 155 stores program code for a user interface for each of the available intents that can be performed by the morphing interface system 130. An interface stored by the interface store 155 may include layouts for displaying the interface on a client device 110, instructions for executing the intent, and a list of entities associated with populating the layouts and executing the intent. In various embodiments, the user interfaces may be interfaces that have been custom made for each potential intent. In other embodiments the interface store 155 can contain custom interfaces for custom intents designed by users, and only for use by those users.

The entity recognition module 145 predicts a set of entity values associated with a given user input. The entity values may be used to execute an intent that is matched to the user input. In various embodiments, the entity recognition module 145 accepts the user input string, the associated NLP signals from the NLP pipeline 135, and the matched intent from the intent matching module 140 as input. The entity recognition module 145 may also access the interface store 155 to use the interface associated with the matched intent as an input, thus obtaining the list of entity values that will be needed for the morphing interface system 130 to execute the intent. The entity recognition module 145 may apply a trained computer model to extract a set of values from a user input string and to associate the extracted values with entities of the matched intent. In one embodiment, the entity recognition module 145 first extracts high level entity values from the input string and later extracts detailed entity values. For example, the entity recognition module 145 may apply a model that determines that the user input string includes a title, and may apply a different model to predict whether the title is a movie title, book title, etc. In one embodiment, the one or more computer models applied by the entity recognition module 145 are classifiers or sequence taggers that are trained on example training data including example user input strings with labeled entity values. These classifiers or sequence taggers may have further been trained using multiple objectives (language modeling, auto-encoding, etc.) on massive quantities of unstructured, unlabeled textual information from the internet to incorporate real world knowledge and an understanding of syntax, grammar and semantics.

In other example embodiments, the entity recognition module 145 may apply rule-based methods to extract the set of values from a user input string, such as matching against regular expression patterns. This in turn may assist with rapid customization of the entity recognition module 145 to extract values for new, custom intents designed by users.

The models and training data applied by the entity recognition module 145 may be stored in a entity recognition model store 160. The entity recognition model store 160 also may include labeled training data for training the computer models used by the entity recognition module 145.

In some embodiments, the entity recognition module 145 and the intent recognition module 140 may be the same system. That is, the entity recognition module 145 and the intent recognition module 140 may be configured as a joint intent and entity recognition system so that both systems can collaboratively make more accurate decisions.

Morphing Interface System Example

Figure 2:
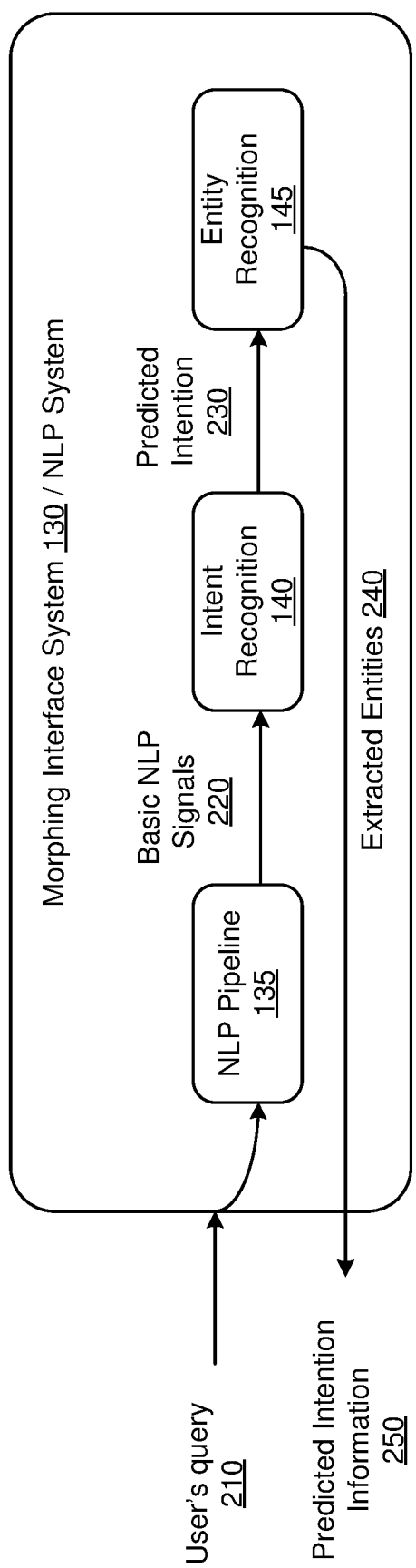
FIG. 2 is a high level diagram of the interactions between components of the morphing interface system 130, in accordance with an example embodiment.

FIG. 2 is a high level diagram of the interactions between components of the morphing interface system 130, in accordance with an example embodiment. The morphing interface system 130 receives a user query 210. The user query may be a complete sentence or concept, or a partial sentence or phrase, expressed by a user, for example, in the form of typed text or spoken audio. In embodiments that receive input as an audio file or audio stream, an automatic speech recognition or other type of speech models may be used to produce an input string that represents the input, e.g., as text. The morphing interface system 130 can begin to respond to a user by displaying an interface as the user is still providing input. In some cases, therefore, the user query 210 received by the morphing interface system 130 may be only a first part of the user input, e.g., a word or set of words.

The user query 210 is provided as input to the NLP pipeline 135, which analyzes the user query 210 and outputs corresponding NLP signals 220. The NLP signals 220 and the user query 210 are provided to the intent recognition module 140. The intent recognition module 140 outputs a predicted intention 230 of the user. That is, the intent recognition module 140 predicts what intent the user is requesting or intending to be performed. The predicted intention 230 or function, NLP signals 220, and user query 210 are provided to the entity recognition module 145, which generates extracted entity values 240 associated with the predicted intent. The predicted intention information 250 about the predicted intention of the user, extracted entities 240, and additional generated metadata may be used by the morphing interface system 130 to enable display (on a screen of a computing device, e.g., client device) of a user interface related to the system prediction corresponding to an intention of the user and to populate fields of the user interface with extracted entity values. Hence, the interface to be generated and enabled (or provided) for display on the client device can advantageously begin to change in substantially real-time.

In some embodiments, the components of the morphing interface system 130 may be configured to interact in ways other than that showed in the example of FIG. 2. In one embodiment, the morphing interface system may be configured to include a feedback loop between the intent recognition module 140 and the entity recognition module 145. For example, the intent recognition module 140 may provide information about a predicted intent to the entity recognition module 145, the entity recognition module 145 may use the information about the predicted intent as an input to identify entities and potential entity types in the user query 210, and the information about identified entities may be provided back to the intent recognition module 140 for use in regenerating a prediction of the intent that should be associated with the user's query 210. In some embodiments the entity recognition module 145 may analyze the NLP signals or the user input and predict entities associated with the user input, then provide the predicted entities and entity types in addition to the input and NLP signals to the intent recognition module 140. In such cases, the intent recognition module 140 may then predict an intent type associated with the user input using the predicted entity information. A feedback loop between the intent recognition module 140 and the entity recognition module 145 may also exist in this embodiment (i.e., the intent recognition module 140 may send the predicted intent information back to the entity recognition module 145 to improve or add to the existing predictions about entities). In some embodiments where the entity recognition module 145 received the input data before the intent recognition module 140, the intent recognition module 140 may filter the extracted entities provided by the entity recognition module 145 to entities that correspond to the predicted intent.

In other example embodiments, one module may be configured to perform the functions of both the intent recognition module 140 and the entity recognition module 145. For example, a model may be trained to perform both intent recognition and entity recognition. In another example embodiment, the morphing interface system 130 may include submodels associated with entity recognition for each intent type (i.e., for each domain). That is, the morphing interface system 130 may store a different entity recognition model for determining entity values that are associated with each potential intent type, and may use transfer learning to automate the creation of models for new potential intent types, based on the past set of entity recognition models. For example, if the intent recognition module 140 predicts an intention of ordering a pizza, the entity recognition module 145 may then access and use a entity recognition model trained for identifying entities associated with an intent for ordering food. In another example embodiment, the intent recognition module 140 may be configured in the form of a hierarchical model where a first model infers a higher level domain (e.g., "food"), and submodels for that domain then infer the user's specific intent within the predicted domain (e.g., whether the user would like to reserve a table, order takeout, search for recipes, etc.).

In another example embodiment, the morphing interface system may not include an NLP pipeline 135. In such embodiments, the intent recognition module 140 and the entity recognition module 145 are trained to predict intent s and to determine entities based directly on a user query 210.

Figure 3:
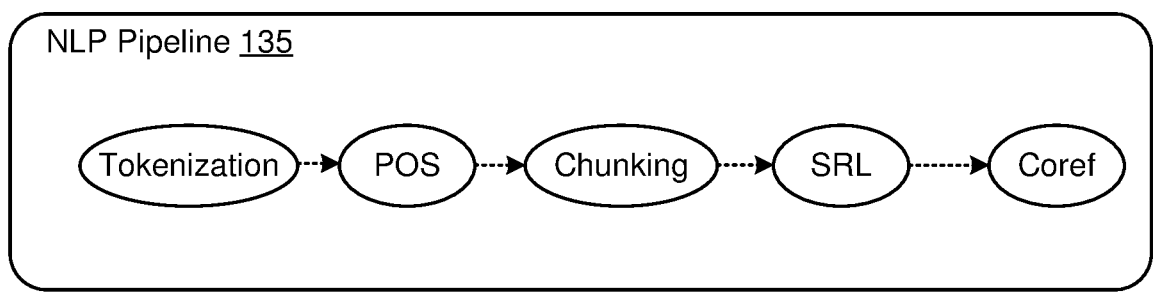
FIG. 3 is a block diagram illustrating example NLP signals, in accordance with an example embodiment.

FIG. 3 is a detailed block diagram illustrating example NLP signals, in accordance with an example embodiment. The NLP pipeline 135 may include tokenization, part-of-speech (POS) tagging, text chunking, semantic role labeling (SRL), and coreference resolution functionalities for generating various NLP signals from a user input string. Some other example NLP signals include lemmatization, stemming, dependency parsing, entity extraction, and stopword identification. In various embodiments, different combinations of NLP signals may be used in an NLP pipeline 135 and the signals may be determined in various orders. For example, in another example embodiment, the NLP pipeline 135 may determine NLP signals in the order of tokenization, stemming, lemmatization, stopword identification, dependency parsing, entity extraction, chunking, SRL, then coreference resolution.

Figure 4A:
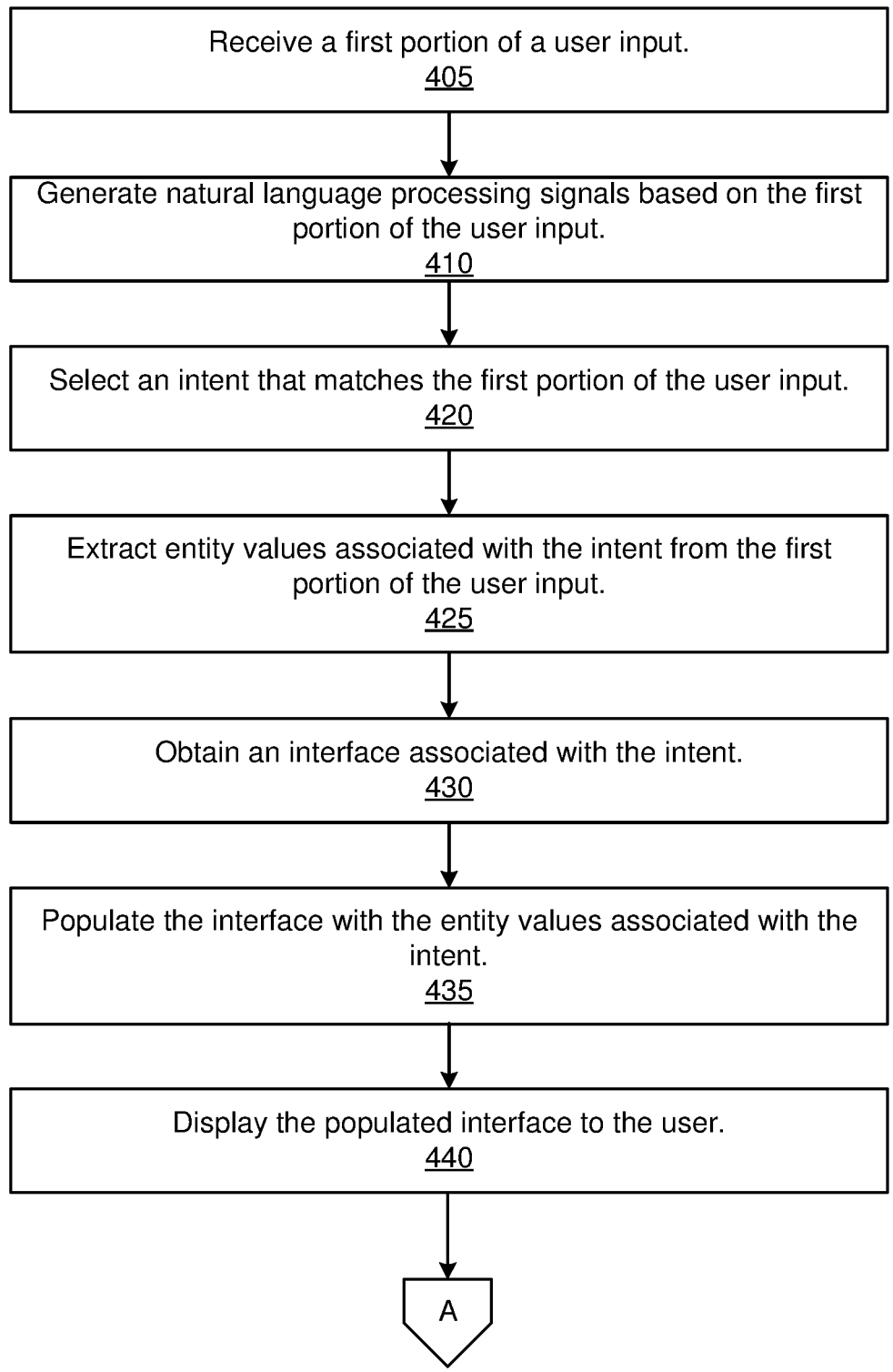
FIG. 4A is a flowchart illustrating a process of generating an interface from a user input, in accordance with an example embodiment.

FIG. 4A is a flowchart illustrating an example process of generating an interface from a user input, in accordance with an example embodiment. The morphing interface system 130 receives 405 a first portion of a user input. A first portion of a user input may be, for example, a word or words at the start of a sentence, and may be received by the morphing interface system 130 in a variety of input forms including as text or spoken input. The morphing interface system 130 generates 410 natural language processing signals based on the received first portion of the user input. The NLP pipeline 135 may generate the natural language processing signals using various analysis techniques including tokenization, part-of-speech (POS) tagging, dependency parsing, entity extraction, stemming, lemmatization, stopword identification, text chunking, semantic role labeling, and coreference resolution.

The morphing interface system 130 selects 420 an intent that matches the first portion of the user input. In some embodiments, an intent recognition module 140 applies a trained computer model to predict which intent is most applicable to responding to the first portion of a user input. That is, the intent recognition module 140 selects an intent that is implied by the received user input.

The morphing interface system 130 extracts 425 entity values associated with the predicted intent from the first portion of the user input. In one embodiment, a entity recognition module 145 applies trained computer models to extract relevant values from the received user input. In some embodiments, the morphing interface system 130 is configured to include a feedback loop such that information about the extracted entities are sent as additional inputs to the intent recognition module 140. In some embodiments, this may also include an automated retraining and self-improvement cycle. The morphing interface system 130 obtains 430 an interface associated with the selected intent. In some embodiments, the selected interface is used in the process of extracting entities associated with the intent. For example, an interface associated with an intent may include input fields for values related to that particular intent, and the entity recognition module 145 may use information about the input fields to identify values from the user input. The extracted entity values that are associated with the selected intent are used to populate 435 the interface. In some embodiments, the interface may only be partially populated, for example if the portion of the user input received so far includes only some of the information that is needed to complete input fields included in the interface layout. For example, in a case where the user has paused after providing input including, "book me a flight," the morphing interface system 130 may highlight a calendar and prompt the user with a query such as, "When do you want to fly," to receive more user input for further populating the user interface. The morphing interface system 130 displays 440 the populated interface to the user, for example, via a client device 110.

In some embodiments, the morphing interface system 130 may select 420 more than one applicable intent when multiple intents have similar or equivalent predicted likelihoods of being applicable to the first portion of user input. For example, a first portion of user input may be "Order me coffee" and the morphing interface system 130 may determine that intents for buying a bag of coffee beans and ordering a cup of coffee from a café are equally likely applicable responses. That is, the morphing interface system 130 may determine that there is an equal likelihood that the user's intent is drink delivery and grocery ordering. In such cases, the morphing interface system 130 may extract 425 entity values associated with two or more of the intents with equal likelihoods and may obtain 430 preview interfaces associated with the multiple possible intents, populate 435 the preview interfaces with the extracted entity values associated with the intents, and provide the populated preview interfaces for display 440 to the user at the client device 110. In such embodiments, the morphing interface system may wait for input from the user selecting between one of the multiple possible intents before proceeding to analyze further user input. In some embodiments, that morphing interface system 130 may store information about user selections of preview interfaces with respect to the provided user input so that in the future, the system can increase the likelihood of a user selecting a particular intent based on that pattern of user input. Thus, after some history of interactions with the morphing interface system 130, the user may be presented with fewer intent previews as the user preferences and input patterns are stored.

Figure 4B:
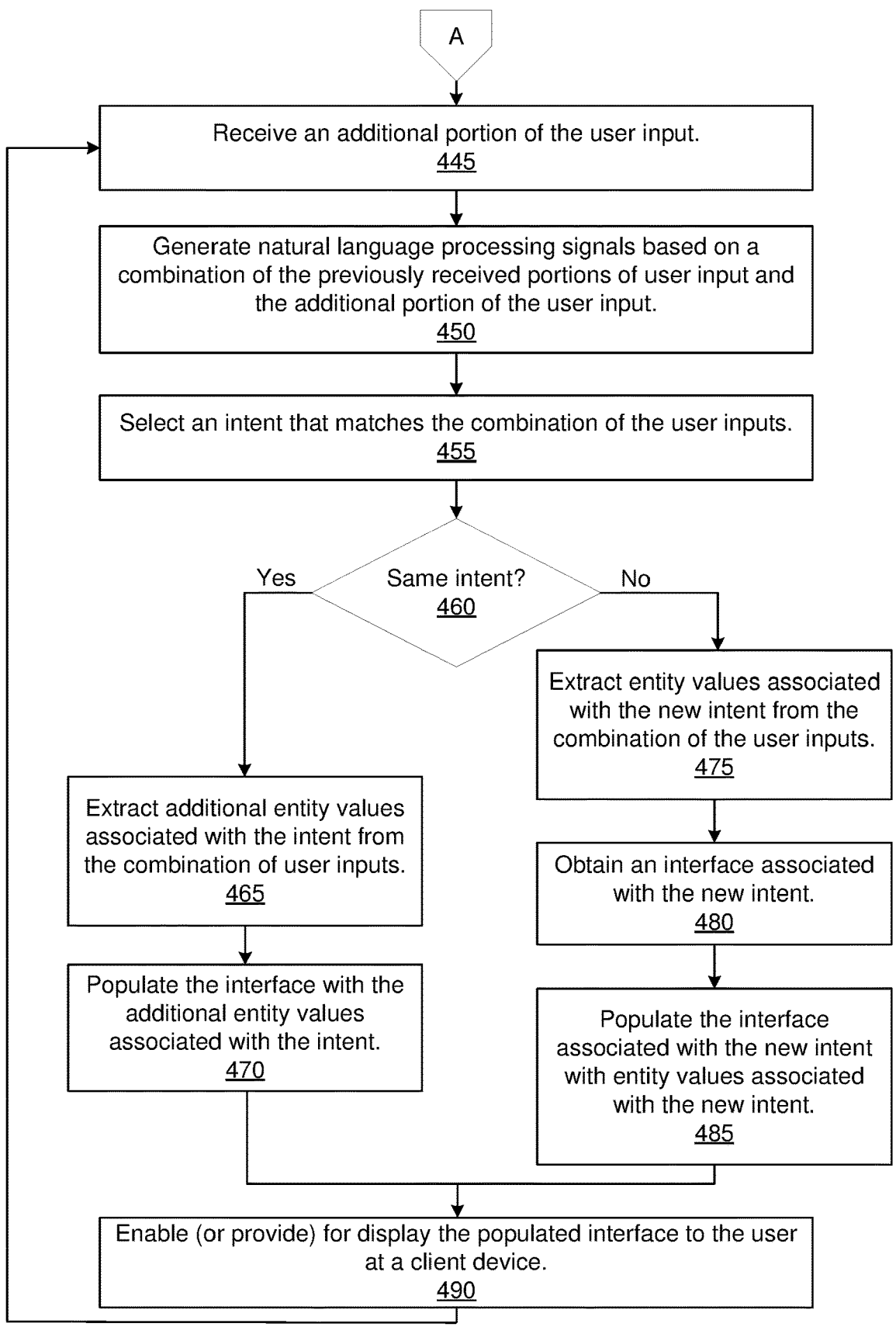
FIG. 4B is a flowchart illustrating a process of morphing an interface upon receipt of additional user input, in accordance with an example embodiment.

FIG. 4B is a flowchart illustrating a process of morphing an interface upon receipt of additional user input, in accordance with an example embodiment. The morphing interface system 130 may enable (or provide) an interface for display at a client device 110 as soon as a portion of a user input is received for analysis. Enabling (or providing) an interface for display at a client device 110 may include providing the code, command, and/or data for the operating system of the client device 110 to display the user interface corresponding to the intent and/or morphing structure defined by the morphing interface system 130. As additional user input is received, the morphing interface system 130 repeatedly reevaluates whether the selected intent is still the best match for the growing user input string. If the morphing interface system determines 130 that the same intent still applies, then additional entity values may be extracted from the augmented user input. However, if the morphing interface system determines 130 that, given the additional user input, a different intent is more applicable, the system will enable (or provide) for display a change (e.g., "morph") of the user interface to a different, more applicable intent. Visually on a screen (e.g., of a client device 110) the change may be, for example, a gradual visual transition to a full refresh of the user interface. Further, the morphing interface system may enable the user interface to change any number of times as user input is added over time.

In particular, after a first portion of user input is received and analyzed as described in FIG. 4A, the morphing interface system 130 continues to analyze a growing string of user input as additional portions of user input are received, as in FIG. 4B. The morphing interface system 130 receives 445 an additional portion of the user input. For example, the first portion of the user input may have been a first word of a sentence, and the process of FIG. 4B may be started in response to receiving a second word in the user input sentence.

The morphing interface system 130 generates 450 natural language processing signals based on a combination of the previously received portions of user input and the additional portion of the user input. An intent that matches the combination of the user inputs is selected 455, for example, by an intent matching module 140.

The morphing interface system 130 determines 460 whether the matched intent is the same as the most recently matched intent or if the matched intent is a new intent. The new intent may be a different intent from the intent that is associated with the interface that is currently being displayed at the client device 110.

If the intent is the same intent, then the morphing interface system 130 extracts 465 additional entity values associated with the intent from the combination of the previous user inputs and the current (i.e., most recent) user input. The interface is populated 470 with the additional entity values associated with the intent.

If the intent is not the same intent as the previous intent that was matched to the previous collection of user inputs, the morphing interface system 130 extracts 475 entity values associated with the new intent from the combination of the user inputs. An interface that is associated with the new intent is obtained 480, for example, from the interface store 155. The obtained interface is populated 485 with the extracted entity values that are associated with the new intent.

The morphing interface system 130 enables (or provides) for display 490 the populated interface, whether the same interface as before, or the newly obtained interface, to the user, for example, via the client device 110. The process illustrated in FIG. 4B may be repeated whenever additional portions of user input are received 445 by the morphing interface system 130.

The following FIGS. 5A through 5G illustrate an example of an interface executing an intent as additional user input is received, in accordance with an embodiment. In one embodiment the interface is a user interface presented for display on a screen of a computing device, e.g., a client device 110 such as a smartphone, tablet, laptop or desktop computer. FIGS. 5A through 5G show an example in which the user input received, e.g., via the client device 110, has been matched to a general intent (i.e., function or user request) of booking a flight. The layouts of the displayed interface morph and change as additional entity values associated with the selected interface are determined in response to the receipt of additional user input. However, in the example of FIGS. 5A through 5G, the morphing interface system 130 does not determine that a new intent better matches the user input, and the displayed layouts remain associated with the flight booking interface accordingly.

Figure 5A:
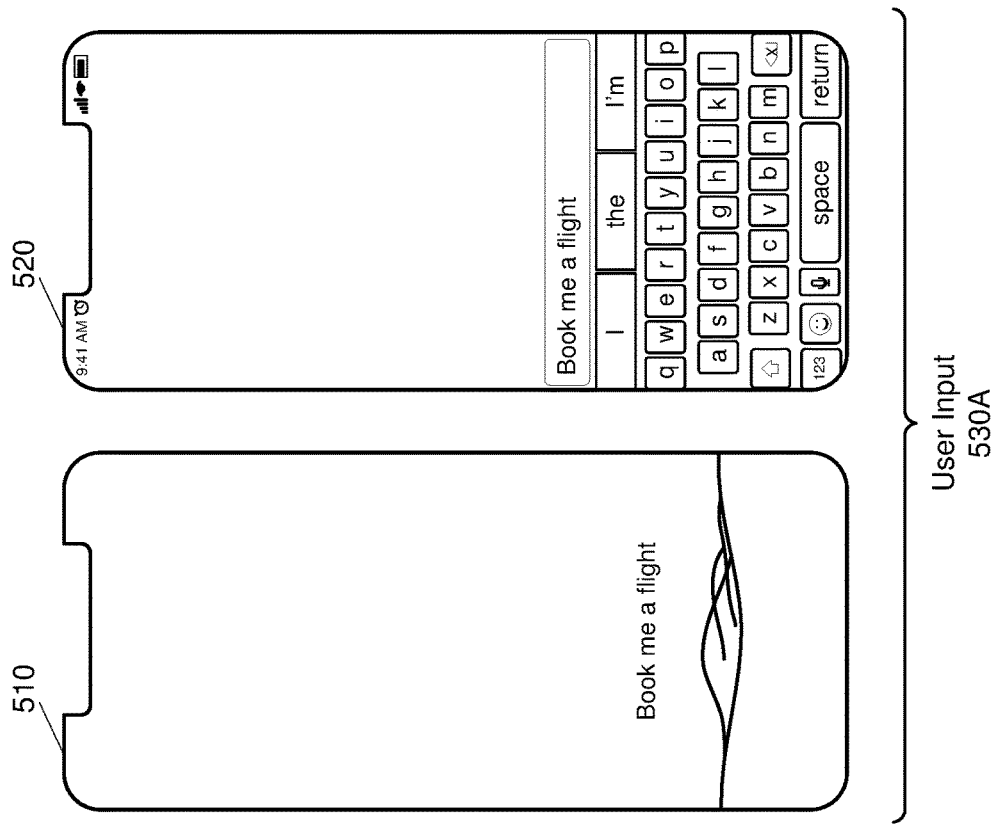
FIG. 5A illustrates a first layout displayed for an interface associated with a flight-booking intent, in accordance with an example embodiment.
Figure 5A:
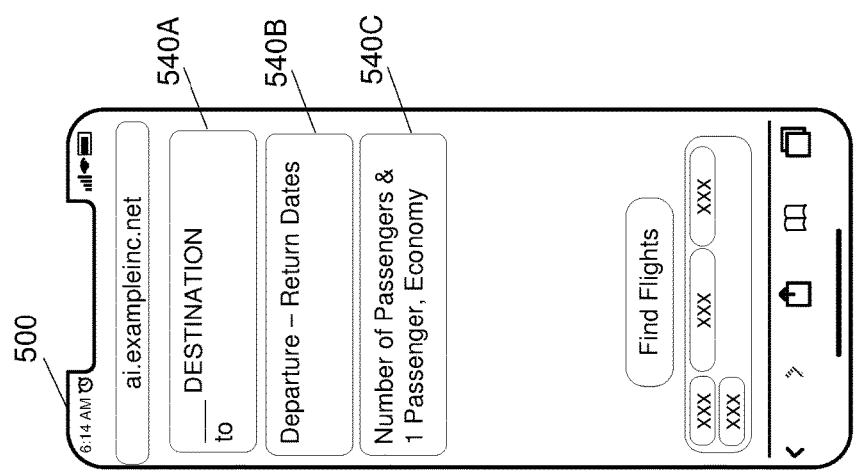

FIG. 5A illustrates a first layout displayed for an interface associated with a flight-booking intent, in accordance with an example embodiment. An interface 500 associated with flight booking is selected by the morphing interface system 130 based on the user input 530A that has been received. In the drawings for FIGS. 5A-5E, a display layout associated with a selected interface 500 is shown on the left side of the figures and representations of two possible kinds of user input 530 are shown on the right sides of the figures. In various embodiments, the actual display on a user device may appear as the layouts of the interface 500, an alternation between the interface 500 and a user input layout, a split screen showing part of the interface 500 and part of a user input 530 entry display layout, or another display scheme. In one example embodiment, when the interface 500 is updated, e.g., in response to new user input 530, the display as shown on the left of the Drawings begins to morph to show the next layout or interface. For example, the user interface 500 at the left of FIG. 5A morphs into the layout for the user interface 500 at the left of FIG. 5B. This interface morphing may occur between each successive user interface, for example as a transition between interfaces 500 described in successive FIGS. 5A-5G and 6A-6D. The example types of user input 530 shown in FIG. 5A include spoken input 510, and typed input 520.

In the example of FIG. 5A, the morphing interface system 130 receives an initial user input 530A that includes the text string, "Book me a flight". The morphing interface system 130 determines that the user input 530A is most likely associated with the intent of flight booking, and the flight booking interface 500 is displayed approximately instantaneously accordingly. The interface 500 may include widgets 540. A widget may be a portion of an interface layout that displays or collects information related to a an entity associated with the interface. In some cases a widget 540 may be an input field (e.g., a text field, checkbox, or other data input format). The interface 500 may display widgets 540 that can be populated with entity values determined by the entity recognition module 145. In various embodiments, an interface 500 may display some or all widgets 540 for entities associated with the interface 500 even before the entity recognition module 145 has determined a value with which to populate the input field. For example, FIG. 5A includes a widget 540A that includes a space for inputting a destination value for the flight booking. FIG. 540B similarly includes a departure and return date widget 540B that includes a space for inputting values of dates for a flight booking and a widget 540C indicating a number of passengers, for which the entity recognition module 145 has predicted the values of "1 passenger, economy" will be the most likely input values, and the values appear populated in the widget 540C accordingly.

Figure 5B:
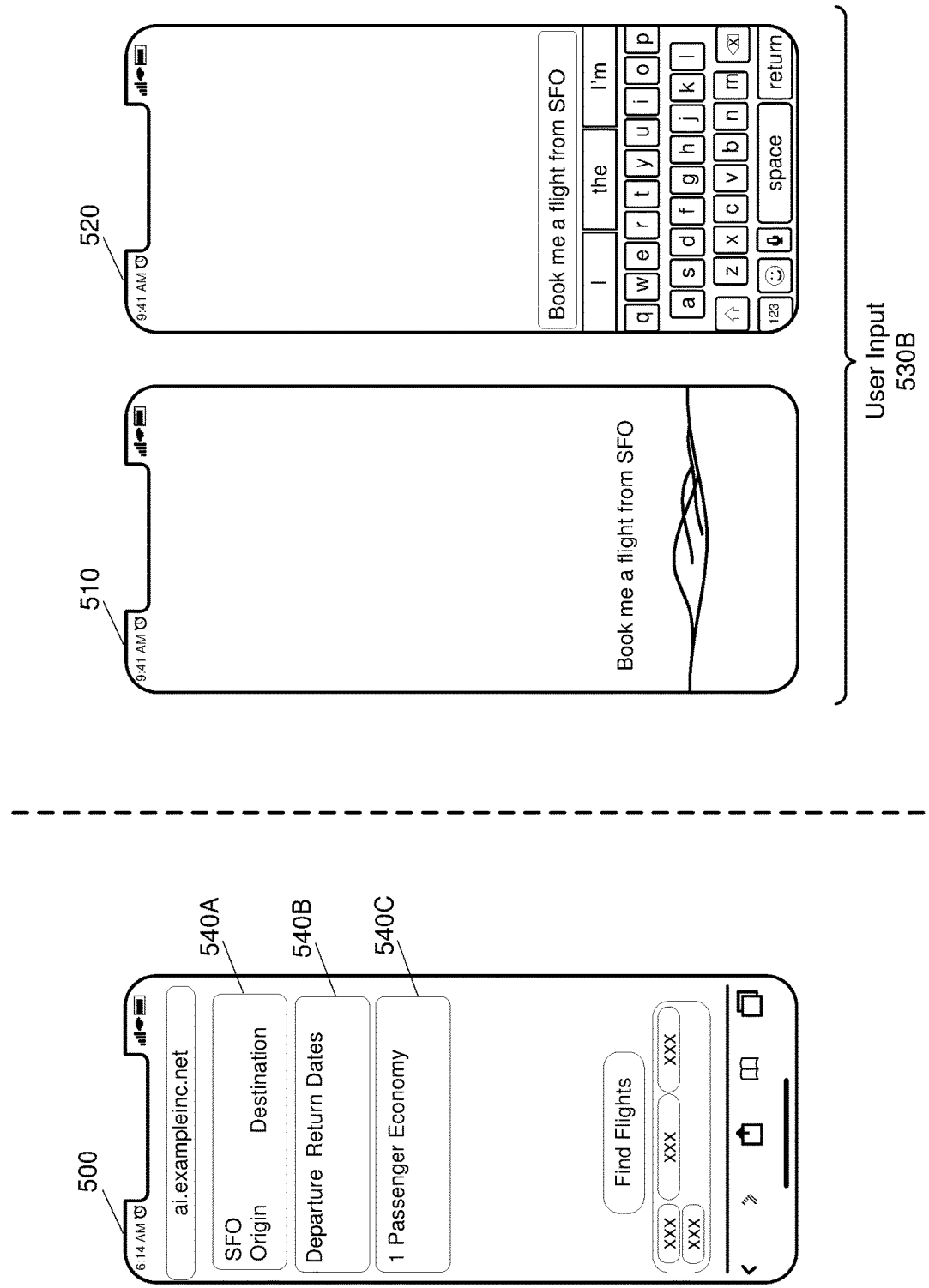
FIG. 5B illustrates a second layout displayed for an interface associated with a flight-booking intent, in accordance with an example embodiment.

FIG. 5B illustrates a second layout displayed for an interface associated with a flight-booking intent, in accordance with an example embodiment. In FIG. 5B, the user input 530B includes additional information. In particular, the user has added more input so that the user input 530B now includes, "Book me a flight from SFO". The morphing interface system 130 determines that the selected intent should still be flight booking, and identifies additional entity value information for further populating the widgets 540 in the interface 500. Accordingly, the user interface 500 morphs from the layout of FIG. 5A to the layout shown in FIG. 5B. For example, the interface 500 shown in FIG. 5B includes an origin "SFO" entered for the flight origin information in the widget 540A. In some embodiments, morphing an interface from one layout to another layout may include the display of animations, such as a moving expansion of sections of the layout that can be further populated using newly received information from the user input, e.g., as new entity information is extracted from the user input.

Figure 5C:
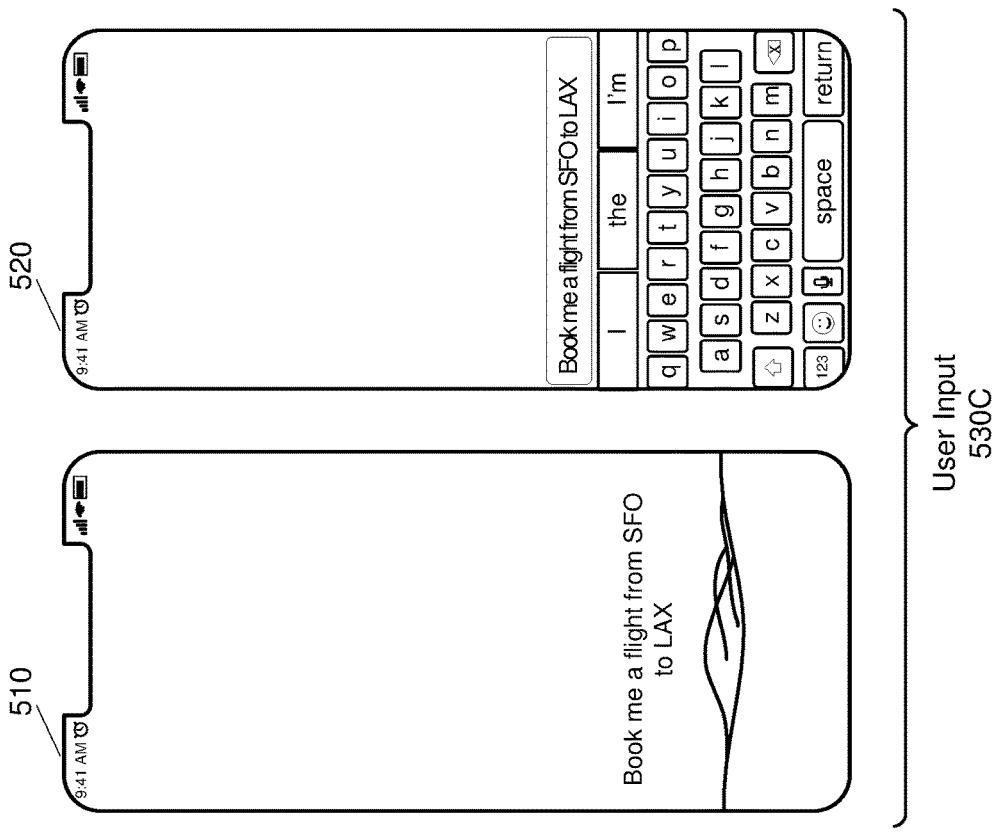
FIG. 5C illustrates a third layout displayed for an interface associated with a flight-booking intent, in accordance with an example embodiment.
Figure 5C:
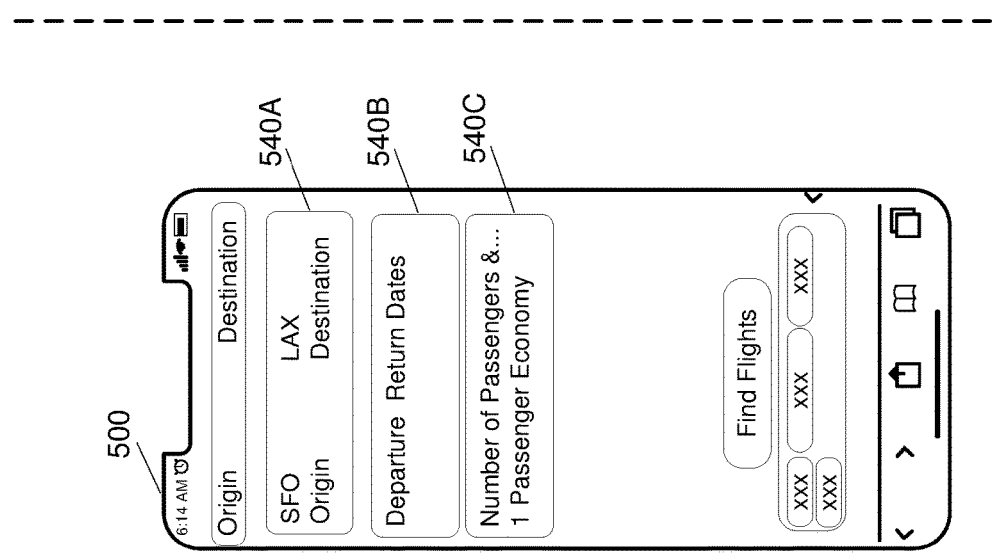

FIG. 5C illustrates a third layout displayed for an interface associated with a flight-booking intent, in accordance with an example embodiment. In FIG. 5C, the user input 530C includes still more additional information. Particularly, the user has added input so that the user input 530C includes, "Book me a flight from SFO to LAX". The morphing interface system 130 determines that the selected intent should still be flight booking. The morphing interface system 130 identifies additional entity value information for further populating the widgets 540 in the interface 500, including, for example, a destination "LAX" in the destination field of widget 540A. Thus, the user interface 500 morphs from the layout shown in FIG. 5B to the layout shown in FIG. 5C.

Figure 5D:
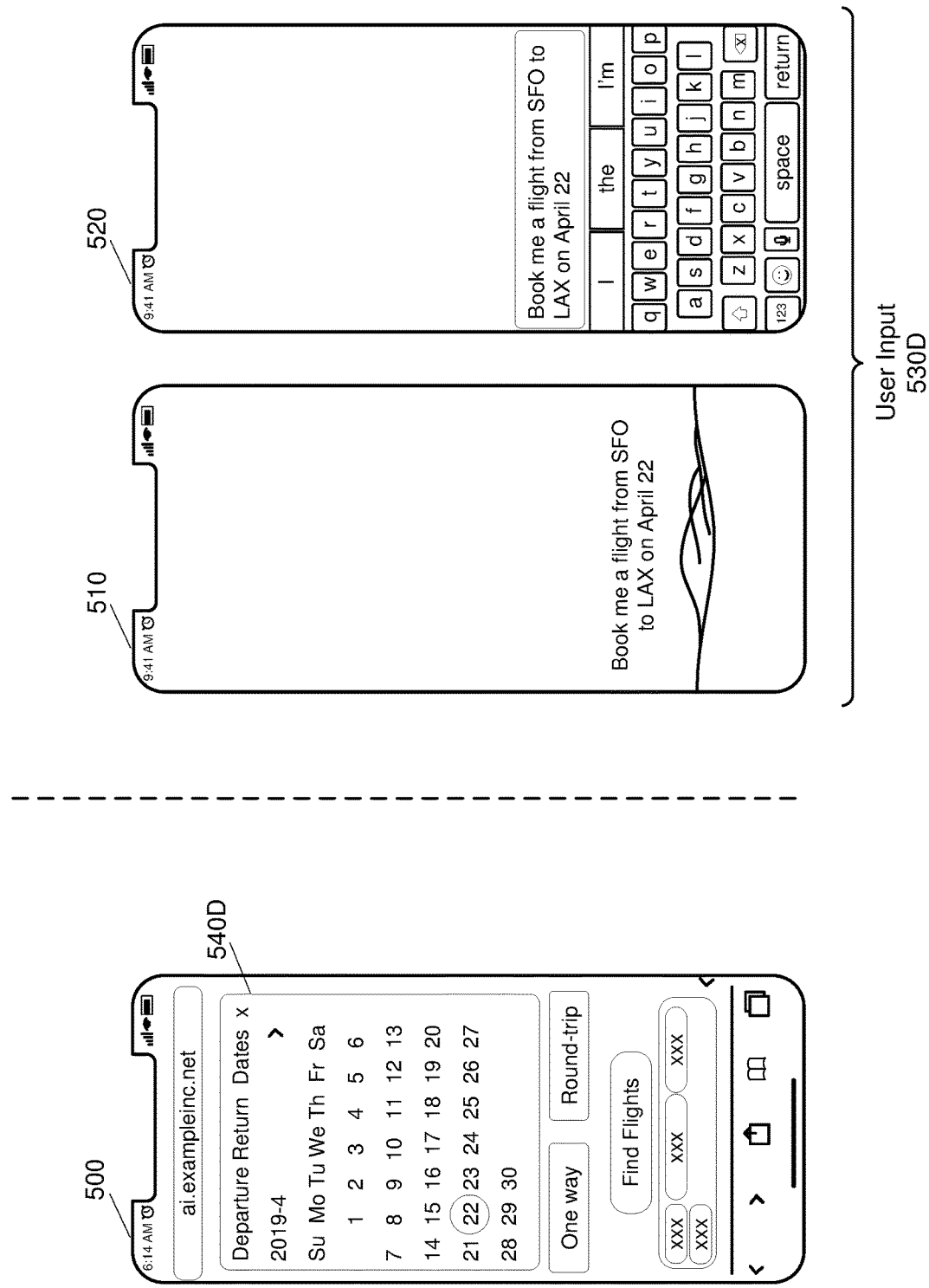
FIG. 5D illustrates a fourth layout displayed for an interface associated with a flight booking intent, in accordance with an example embodiment.

FIG. 5D illustrates a fourth layout displayed for an interface associated with a flight booking intent, in accordance with an example embodiment. In FIG. 5D, the user input 530D includes additional information. In particular, the user has added more input so that the user input 530D now includes, "Book me a flight from SFO to LAX on April 22". The morphing interface system 130 determines the selected intent should still be flight booking, and extracts additional entity value information for further populating the interface 500. Accordingly, the user interface 500 morphs from the layout shown in FIG. 5C to the layout shown in FIG. 5D. For example, FIG. 5D shows an expanded widget 540D that shows departure date information about the flight requested by the user, with April 22 selected.

Figure 5E:
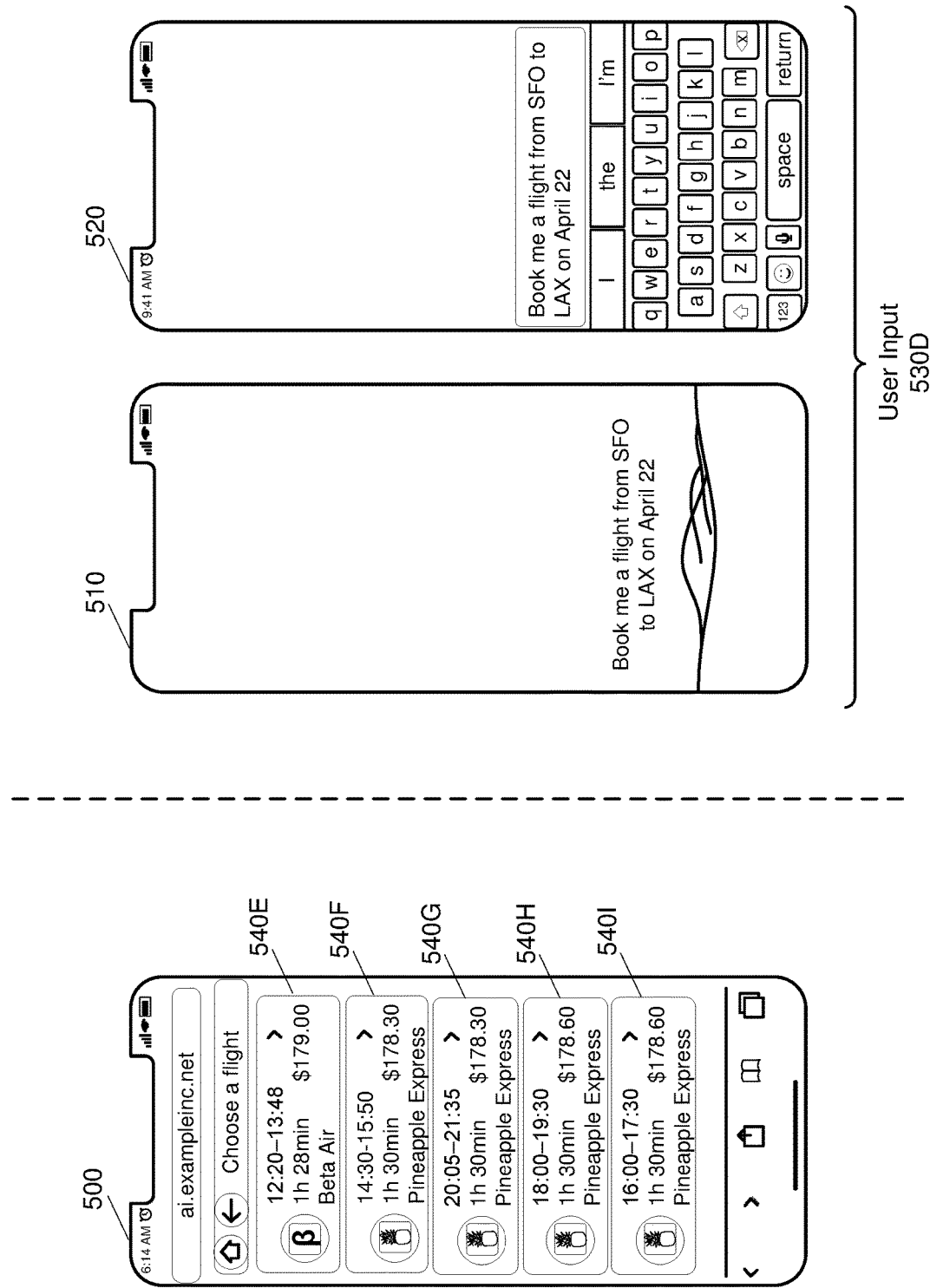
FIG. 5E illustrates a fifth layout displayed for an interface associated with a flight-booking intent, in accordance with an example embodiment.

FIG. 5E illustrates a fifth layout displayed for an interface associated with a flight booking intent, in accordance with an example embodiment. When the morphing interface system 130 determines that the entity values associated with the selected intent have all been extracted and applied to the intent, the intent may execute to generate a response for the user. The layout of the interface 500 may then include a display of the response. For example, when the entity recognition module 145 identifies values associated with all the entities needed for booking a flight, the intent executes and presents a layout of the interface 500 that identifies possible flights that meet the criteria specified in the user input 530. For example, the user interface 500 morphs from the layout shown in FIG. 5D to the layout shown in FIG. 5E. The user may then select a flight from the presented options, e.g., from the widgets 540E, 540F, 540G, 540H, and 540I, which match the possible flights for the criteria specified.

Figure 5F:
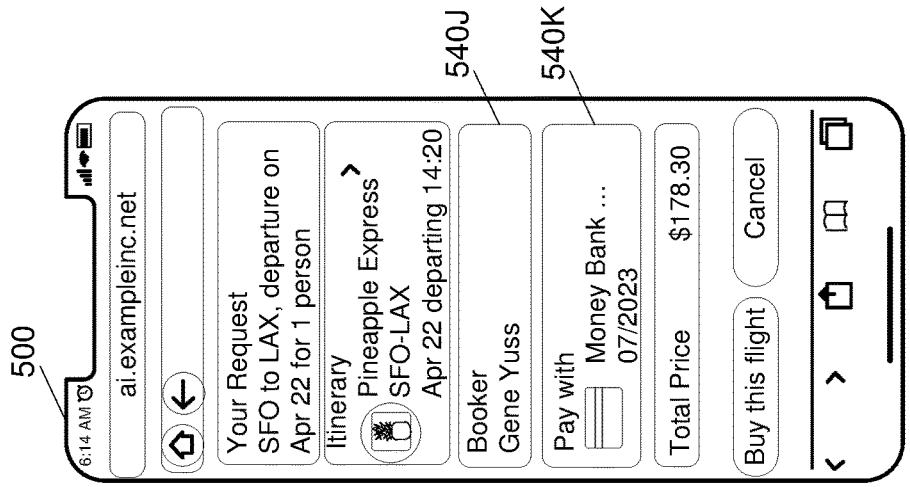
FIG. 5F illustrates a sixth layout displayed for an interface associated with a flight booking intent, in accordance with an example embodiment.

FIG. 5F illustrates a sixth layout displayed for an interface associated with a flight booking intent, in accordance with an example embodiment. In the example of FIG. 5F, the interface 500 displays the selected flight information so that the user can confirm the data before submitting the order to buy the flight. In some embodiments, the morphing interface system 130 may use various personalization techniques to determine values for entities related to a user. In one embodiment, the morphing interface system 130 can store user profile information for use in executing intents. For example, the morphing interface system 130 may store a user name, credit card number, home and work locations, etc. For example, in FIG. 5F, the booking user and credit card information at widgets 540J and 540K are filled in by the morphing interface system 130 without the information being included in the user input 530. In some embodiments, the user morphing interface system 130 can verify the identity of the user, for example using a voiceprint, to determine whether to include the user information automatically, or whether additional user input will be needed. In some embodiments the morphing interface system 130 may add or remove portions of an interface layout and pre-populate entities as input in layouts using trained models that can predict layout portions and entity values the user is more likely to use, e.g., the particular credit card input for a user may change after a couple of weeks of usage to reflect the most up-to-date regular actions of the user.

Figure 5G:
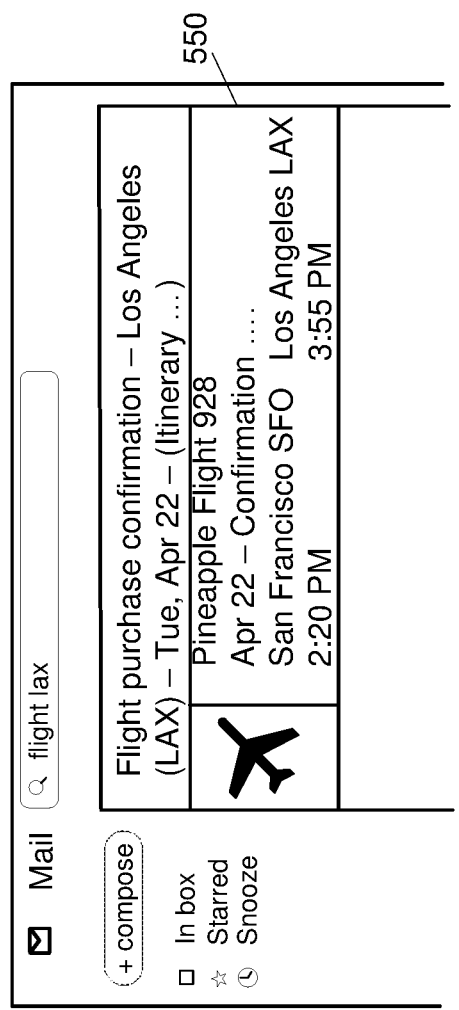
FIG. 5G illustrates an email confirmation of the execution of a flight-booking intent, in accordance with an example embodiment.

FIG. 5G illustrates a portion of a user interface displayed on a screen. The portion of the user interface here is an email confirmation of the execution of a flight-booking intent, in accordance with an example embodiment. The example of FIG. 5G depicts an email 550 received by the user confirming that the user purchased a flight. For some intents, such an email confirmation may not be included as a part of the intent execution.

The following FIGS. 6A through 6D illustrate an example of an interface executing an intent as an additional user input is received, in accordance with an embodiment. FIGS. 6A through 6D show an example in which the user input 530E has been matched to a intent of ordering a pizza. The layouts of the displayed interface morph and change as additional entity values associated with the selected interface are determined in response to the receipt of additional user input. In the example of FIGS. 6A through 6D, the morphing interface system 130 determines upon receipt and analysis of additional user input, that a new intent is a better match to the user input than the originally selected intent, and the displayed interface layouts morph from a pizza ordering interface to a shirt purchasing interface accordingly.

Figure 6A:
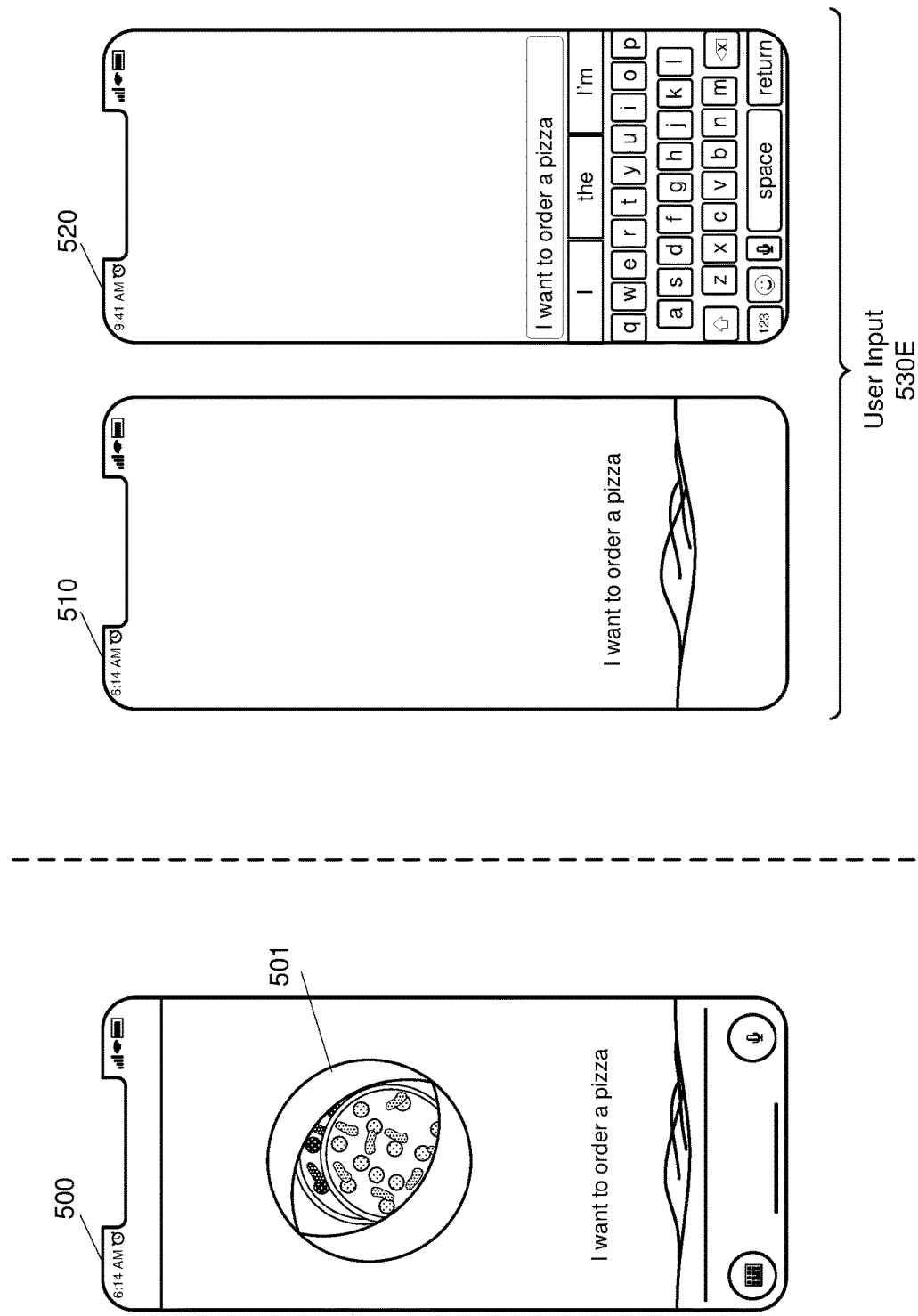
FIG. 6A illustrates receipt of a first portion of user input that is associated with a pizza ordering intent, in accordance with an example embodiment.

FIG. 6A illustrates receipt of a first portion of user input that is associated with a pizza ordering intent, in accordance with an example embodiment. An interface 500 associated with pizza ordering is selected by the morphing interface system 130 based on the user input 530E that has been received. In the particular example of FIG. 6A, the morphing interface system 130 receives an initial user input 530E that includes the text string (on 520), "I want to order a pizza" or a voice input (on 510) that corresponds to "I want to order a pizza". The morphing interface system 130 determines that the user input 530E is most likely associated with the intent of ordering pizza, and the interface 500 begins a transition (e.g., a morph) to display a pizza ordering layout accordingly as shown by a graphical example 501 on interface 500.

Figure 6B:
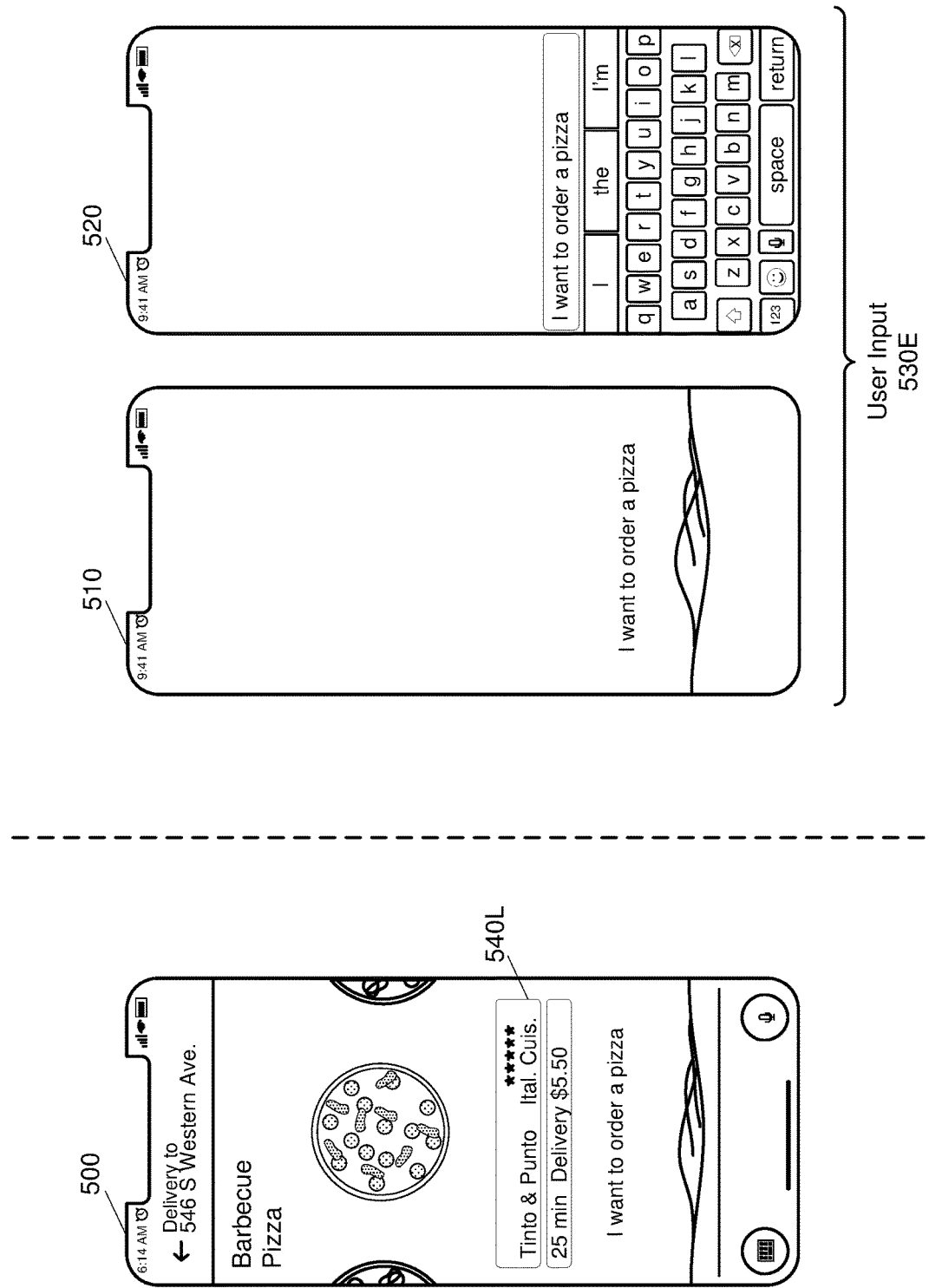
FIG. 6B illustrates the layout displayed for an interface associated with ordering pizza, in accordance with an example embodiment.

FIG. 6B illustrates the layout displayed for an interface associated with ordering pizza, in accordance with an example embodiment, as it transitions from FIG. 6A to 6B. As in FIG. 5A, the interface 500 may include widgets 540 that can be populated with entity values determined by the entity recognition module 145. For example, FIG. 6B includes a widget 540L that includes a space for entering a pizza restaurant. Additional information also may begin to appear on the morphed screen, for example, cost of pizza and delivery time for pizza from the noted restaurant. In the example of FIG. 6B, the entity recognition module 145 has predicted a pizza restaurant that the user may want to order from, and input the information about the restaurant in the widget 540 of the user interface 500.

Figure 6C:
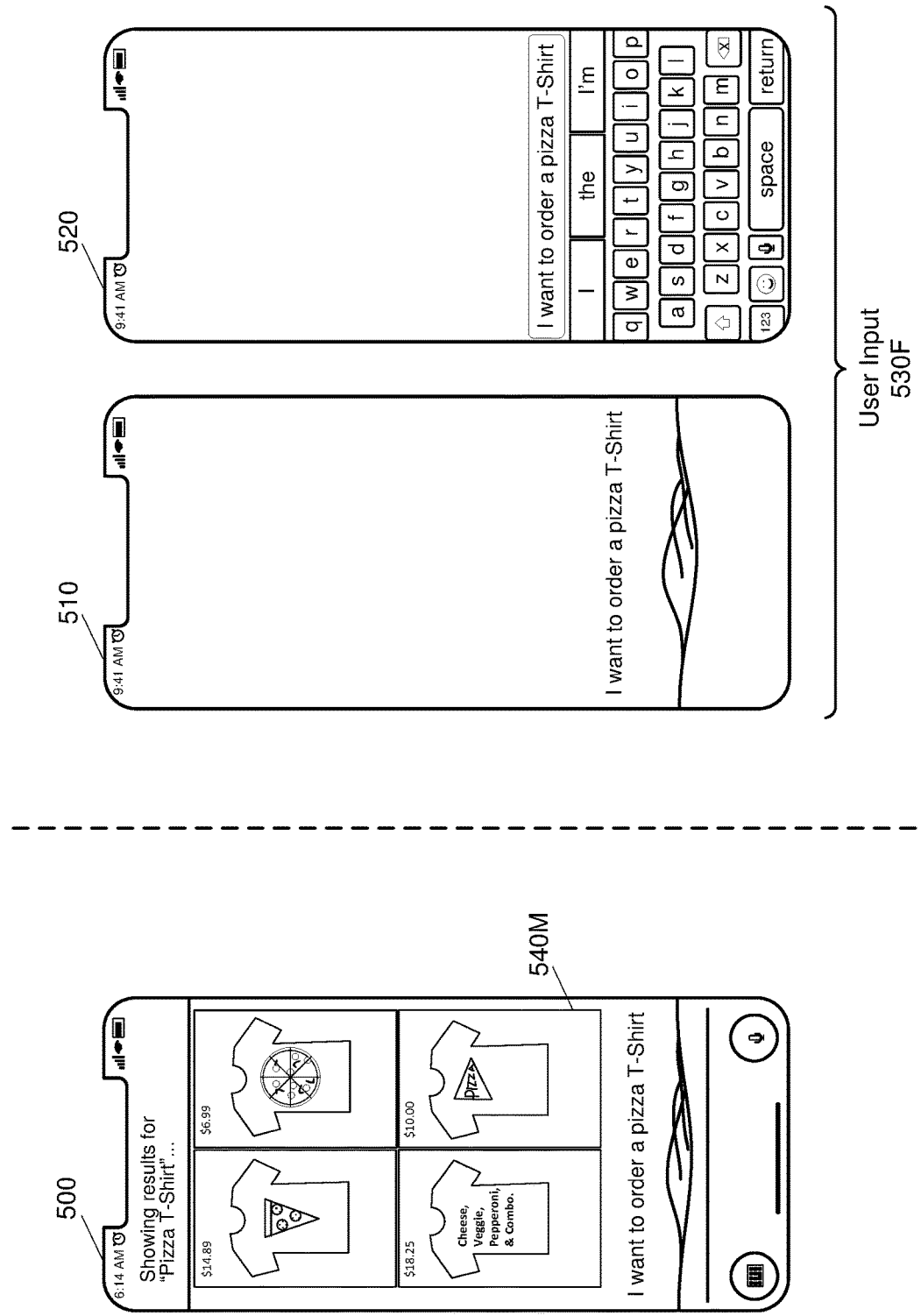
FIG. 6C illustrates a layout displayed for an interface associated with purchasing a pizza T-shirt, in accordance with an example embodiment.

FIG. 6C illustrates a layout displayed for an interface associated with purchasing a pizza T-shirt, in accordance with an example embodiment, as more user input 530F is received and the interface continues to morph from FIG. 6A. In FIG. 6C, the user input 530F includes additional information. Particularly, the user has added input so that the user input 530F now includes, "I want to order a pizza T-Shirt". The intent matching module 140 analyzes the additional user input and determines that the previously selected pizza ordering intent is no longer the most applicable intent, and that the new most relevant intent is a shirt ordering intent. The morphing interface system 130 selects the interface 500 that is applicable to the shirt purchasing intent, and morphs the display at the client device 110 to display layouts associated with the selected intent. For example, rather than displaying a pizza restaurant suggestion, the interface 500 of FIG. 6C now displays a selection of pizza-themed T-shirts available for purchase. That is, the user interface 500 morphs from the interface shown in FIG. 6D displaying pizza ordering, into the interface shown in FIG. 6C displaying pizza t-shirt purchasing options apparently instantaneously as the user continues to provide additional input information. The widgets 540M associated with the example shirt purchasing intent may include pictures of pizza T-shirts that the user can then select for purchasing.

FIG. 6D illustrates additional example interfaces that may be associated with the T-shirt purchasing intent, in accordance with an example embodiment. For example, once the morphing interface system 130 determines that all the entity values needed to execute the intent are available, the process may be taken over by the user. In the example of FIG. 6D, the user may select one of a selection of pizza themed T-shirts, as shown in interface 500A, the user may view additional information about the selected item, as in interface 500B, and the user may confirm order details and place an order for the pizza T-shirt.

The examples of FIGS. 5A to 5G and 6A to 6D beneficially reflect rapidly changing (e.g., morphed) user interfaces that change via a substantially (or almost) simultaneous refresh as a received user input is gradually augmented with additional information. Unlike conventional systems, here the user need not have to parse through potential recommendations that conventional systems present to them as the user provides user input. Moreover, unlike conventional systems the user need not await the full selection of the user input to begin seeing what user interface is displayed for presentation at the moment (e.g., currently provided) that corresponds to the augmented input string. Further, unlike conventional systems a user interface enabled for display on a screen of a computing device almost instantaneously (or immediately) begins to reflect the partial input and rapidly evolves to reflect the present input as additional terms are contextually added to the user input and finishes with the appropriate final user interface corresponding to the full user input. That is, the user interface enabled for display at text input TX0+TX1 is substantially immediately updated from the user interface enabled for display of the original user input TX0.

Example Computing System

Figure 7:
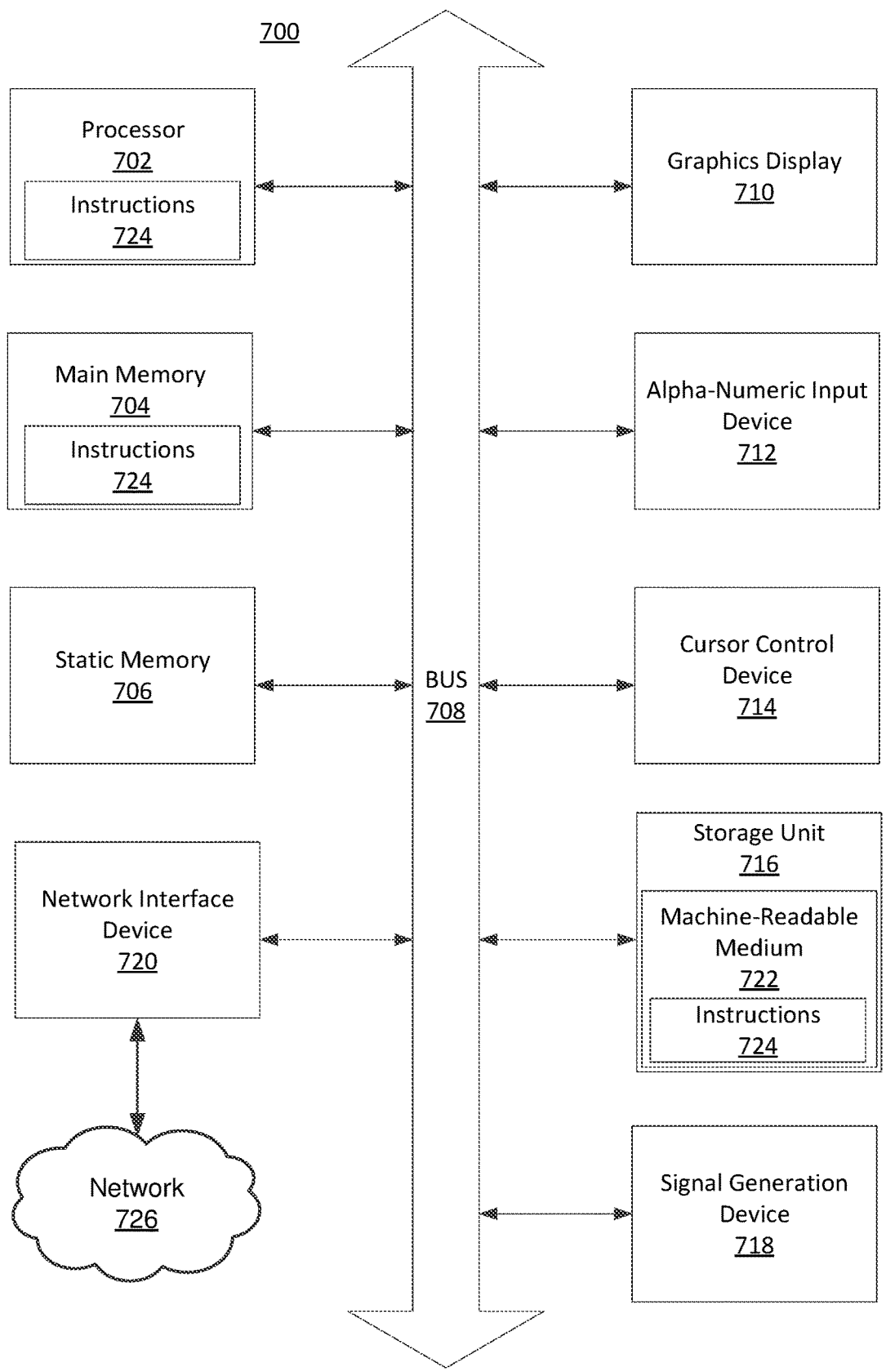
FIG. 7 is a block diagram illustrating components of an example machine able to read instructions from a machine-readable medium and execute them in one or more processors, in accordance with an example embodiment.

FIG. 7 is a block diagram illustrating components of an example machine able to read instructions from a machine-readable medium and execute them in one or more processors (or controllers), in accordance with an example embodiment. Specifically, FIG. 7 shows a diagrammatic representation of the morphing interface system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 700. The computer system 700 also includes a main memory 704. The computer system may include a storage unit 716. The processor 702, memory 704, and the storage unit 716 communicate via a bus 708.

In addition, the computer system 706 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the NLP pipeline 135, the function matching module 140 and/or the entity recognition module 145. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720. Further, for the client device (or user device), the instructions received may be instructions from a server system that enable functions on the client device. For example, how a user interface is to be displayed may include receiving code for how the user interface should be enabled (e.g., rendered) for display based on how that code appropriately interfaces with the operating system of the client device.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   receiving, from a user device, a first user input comprising an input string;
   generating, while a continuation of the input string is received, a set of natural language processing signals based on the first user input;
   selecting an intent that matches the first user input, the selection based on the natural language processing signals, the intent corresponding to a computer executable function;
   identifying a first interface associated with the intent;
   extracting, from the first user input, a set of values associated with entities of the first interface;
   approximately instantaneously to the receipt of the first user input, enabling the first interface for display on the user device, the display of the first interface including values from the set of values;
   accessing the received second user input;
   generating an updated set of natural language processing signals based on the combination of the first user input and the second user input;
   selecting an intent that matches the combination of the first user input and the second user input, the selection based on the updated set of natural language processing signals;
   identifying a second interface associated with the newly selected intent;
   extracting, from the combination of the first user input and the second user input, a second set of values associated with entities of the second interface;
   predicting one or more intents associated with the newly selected intent;
   updating the second interface to include one or more items associated with the predicted one or more intents; and
   enabling, for display on the user device, a continually displayed visual transition from the first interface to the second interface and to the updated second interface, the second interface including values from the second set of values.

2. The computer-implemented method of claim 1, wherein the first user input is a voice input.

3. The computer-implemented method of claim 1, wherein selecting an intent that matches the user input comprises comparing the first user input to one or more previously received user input strings and, responsive to the first user input matching the one or more previously received user input strings, selecting an intent that was selected in response to at least one of the previously received user input strings.

4. The computer-implemented method of claim 1, wherein selecting an intent that matches the user input comprises applying a trained computer model to predict a most applicable intent.

5. The computer-implemented method of claim 1, wherein an interface includes an associated set of entities.

6. The computer-implemented method of claim 1, wherein the first interface and the second interface are the same interface.

7. The computer-implemented method of claim 1, wherein the first interface and the second interface are different interfaces.

8. The computer-implemented method of claim 1, wherein the input string is a text string.

9. The computer-implemented method of claim 1, wherein the input string is an audio input.

10. A computer system comprising:
    one or more computer processors for executing computer program instructions; and
    a non-transitory computer-readable storage medium comprising stored instructions executable by at least one processor, the instructions when executed causing the processor to:

receive, from a first user device, a first user input comprising an input string;

generate, while a second user input comprising a continuation of the input string is received, a set of natural language processing signals based on the first user input;

select an intent that matches the first user input, the selection based on the natural language processing signals, the intent corresponding to a computer executable function;

identify a first interface associated with the intent;

extract, from the first user input, a set of values associated with entities of the first interface;

approximately instantaneously to the receipt of the first user input, enable the first interface for display on the user device, the display of the first interface including values from the set of values;

access the received second user input;

generate an updated set of natural language processing signals based on the combination of the first user input and the second user input;

select an intent that matches the combination of the first user input and the second user input, the selection based on the updated set of natural language processing signals;

identify a second interface associated with the newly selected intent;

extract, from the combination of the first user input and the second user input, a second set of values associated with entities of the second interface;

predicting one or more intents associated with the newly selected intent;

updating the second interface to include one or more items associated with the predicted one or more intents; and enable, for display on the user device, a continually displayed visual transition from the first interface to the second interface and to the updated second interface, the second interface including values from the second set of values.

11. The computer system of claim 10, wherein the first user input is a voice input.

12. The computer system of claim 10, wherein the instructions that cause the processor to select an intent that matches the user input comprise instructions to compare the first user input to one or more previously received user input strings and, responsive to the first user input matching the one or more previously received user input strings, instructions to select an intent that was selected in response to at least one of the previously received user input strings.

13. The computer system of claim 10, wherein the instructions that cause the processor to select an intent that matches the user input comprise instructions that cause the processor to apply a trained computer model to predict a most applicable intent.

14. The computer system of claim 10, wherein an interface includes an associated set of entities.

15. The computer system of claim 10, wherein the first interface and the second interface are the same interface.

16. The computer system of claim 10, wherein the first interface and the second interface are different interfaces.

17. The computer system of claim 10, wherein the input string is a text string.

18. The computer system of claim 10, wherein the input string is an audio input.

* * * * *

UNITED STATES PATENT AND TRADEMARK OFFICE
CERTIFICATE OF CORRECTION

PATENT NO. : 11,531,451 B2
APPLICATION NO. : 17/013324
DATED : December 20, 2022
INVENTOR(S) : Sheng Yue It is certified that error appears in the above-identified patent and that said Letters Patent is hereby corrected as shown below:

On the Title Page

Item (60), in Column 1, under "Related U.S. Application Data", Line 2, delete "21, 2020," and insert -- 12, 2020, --, therefor.

Signed and Sealed this
Thirteenth Day of June, 2023

Katherine Kelly Vidal
*Director of the United States Patent and Trademark Office*